United States Patent
Tang

(10) Patent No.: US 10,715,236 B2
(45) Date of Patent: Jul. 14, 2020

(54) WIRELESS COMMUNICATION METHOD AND APPARATUS

(71) Applicant: GUANGDONG OPPO MOBILE TELECOMMUNICATIONS CORP., LTD., Dongguan, Guangdong (CN)

(72) Inventor: Hai Tang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/470,852

(22) PCT Filed: Jan. 5, 2017

(86) PCT No.: PCT/CN2017/070323
§ 371 (c)(1),
(2) Date: Jun. 18, 2019

(87) PCT Pub. No.: WO2018/126411
PCT Pub. Date: Jul. 12, 2018

(65) Prior Publication Data
US 2019/0326971 A1 Oct. 24, 2019

(51) Int. Cl.
*H04B 7/02* (2018.01)
*H04B 7/06* (2006.01)
(Continued)

(52) U.S. Cl.
CPC ......... *H04B 7/0617* (2013.01); *H04B 7/0619* (2013.01); *H04B 7/0695* (2013.01);
(Continued)

(58) Field of Classification Search
CPC .... H04B 7/0617; H04B 7/0695; H04B 7/088; H04W 24/10; H04W 72/0406; H04W 72/046
(Continued)

(56) References Cited

U.S. PATENT DOCUMENTS

2016/0285583 A1 9/2016 Kasher et al.
2017/0026102 A1* 1/2017 Guo .................... H04B 7/0639

FOREIGN PATENT DOCUMENTS

CN 101124734 2/2008
CN 103891161 6/2014
(Continued)

OTHER PUBLICATIONS

3GPP TSG RAN WG1 Meeting NR Ad-Hoc Spokane, USA, 16th-20th 2016 , R1-1701351, Agenda item 5.1.2.2, WF on Beam Correspondence NTT DOCOMO, Samsung, Mitsubish Electric, Media Tek, Sharp, OPPO, MTI,[InterDigital], [CATT],[G],[Huawei]. pp. 1-5.*
(Continued)

*Primary Examiner* — Helene E Tayong
(74) *Attorney, Agent, or Firm* — Hodgson Russ LLP

(57) ABSTRACT

A wireless communication method includes: a terminal device uses a plurality of uplink transmitting beams to send an uplink signal to a network device; receives M1 measurement information sets corresponding to M1 uplink transmitting beams and sent by the network device, a first measurement information set including at least one of: measurement value information corresponding to a first uplink transmitting beam, and measurement value information of each uplink beam pair amongst M2 uplink beam pairs constituting the first uplink transmitting beam, M1 and M2 not being simultaneously equal to 1; uses each downlink receiving beam amongst a plurality of downlink receiving beams to measure a downlink signal sent by the network device using the plurality of downlink transmission beams to obtain down measurement results; and determines, on the basis of the M1 measurement information sets and the downlink measurement results, correspondence results of the correspondence of the transmitting/receiving beams.

20 Claims, 3 Drawing Sheets

(51) Int. Cl.
  *H04B 7/08* (2006.01)
  *H04W 24/10* (2009.01)
  *H04W 72/04* (2009.01)

(52) U.S. Cl.
  CPC ............ *H04B 7/088* (2013.01); *H04W 24/10* (2013.01); *H04W 72/0406* (2013.01); *H04W 72/046* (2013.01)

(58) Field of Classification Search
  USPC ........................................................ 375/267
  See application file for complete search history.

(56) References Cited

FOREIGN PATENT DOCUMENTS

| CN | 104303477 | 1/2015 |
|---|---|---|
| CN | 104508994 | 4/2015 |
| CN | 106134236 | 11/2016 |
| EP | 3185449 | 6/2017 |
| JP | 2004072539 | 3/2004 |
| TW | 201622475 | 6/2016 |
| WO | 2016027398 | 2/2016 |

OTHER PUBLICATIONS

VIVO: "Discussion on beam management for NR MIMO", 3GPP Draft; R1-1700274_Discussion on Beam Management for NR MIMO, 3rd Generation Partnership Project (3GPP), Mobile Competence Centre ; 650, Route Des Lucioles ; F-06921 Sophia-Antipolis Cedex ; France, vol. RAN WG1, No. Spokane, USA; Jan. 16, 2017-Jan. 20, 2017 Jan. 16.*
WIPO, ISR for PCT/CN2017/070323, May 9, 2017.
NTT DOCOMO, Inc., "Beam correspondence information (BCI) acquisition scheme," 3GPP TSG RAN WG1 Meeting #87, R1-1612732, Nov. 2016, 3 pages.
EPO, Office Action for EP Application No. 17890352.2, dated Sep. 20, 2019.
SIPO, First Office Action for CN Application No. 201780077055.4, dated Nov. 28, 2019.
TIPO, Office Action for TW Application No. 106145170, dated Oct. 3, 2019.

* cited by examiner

WIRELESS COMMUNICATION METHOD AND APPARATUS

CROSS-REFERENCE TO RELATED APPLICATION

This application is a U.S. national phase application of International Application No. PCT/CN2017/070323, filed Jan. 5, 2017, the entire disclosure of which is incorporated herein by reference.

TECHNICAL FIELD

The present disclosure relates to the field of communication technologies, and more particularly, to a wireless communication method and device.

BACKGROUND

In a multi-beam system, a terminal device and a network device may train multiple beams by beam forming, and different beams may correspond to different directions and different coverage areas. Specifically, the terminal device may have multiple uplink transmitting beams and multiple downlink receiving beams, and the network device may have multiple uplink receiving beams and multiple downlink transmitting beams. Before performing the specific uplink data transmission, the terminal device and the network device need to separately determine the uplink transmitting beams and the uplink receiving beams used in the current data transmission, and before performing the specific downlink data transmission, the terminal device and the network device need to separately determine the downlink transmitting beams and the downlink receiving beams used in the current downlink data transmission, which cause large signaling overhead and heavy burden on equipment.

SUMMARY

Embodiments of the present disclosure provide a wireless communication method and device, which may reduce signal overhead.

In a first aspect, a wireless communication method is provided, including: transmitting, by a terminal device, an uplink signal to a network device using each of multiple uplink transmitting beams; receiving, by the terminal device, $M_1$ metric information sets corresponding to $M_1$ uplink transmitting beams transmitted by the network device, a first metric information set corresponding to a first uplink transmitting beam among the $M_1$ uplink transmitting beams comprising at least one of: metric value information corresponding to the first uplink transmitting beam, and metric value information of each of $M_2$ uplink beam pairs formed by the first uplink transmitting beam and $M_2$ uplink receiving beams of the network device, wherein the multiple uplink transmitting beams comprise the $M_1$ uplink transmitting beams, and a first uplink beam pair is formed by the first uplink transmitting beam and a first uplink receiving beam among the $M_2$ uplink receiving beams, and a metric value of the first uplink beam pair is obtained by the network device measuring, by means of the first uplink receiving beam, an uplink signal transmitted by the terminal device using the first uplink transmitting beam, $M_1$ and $M_2$ being integers greater than or equal to 1, and at most one of $M_1$ and $M_2$ being equal to 1; measuring, by the terminal device using each of multiple downlink receiving beams, a downlink signal transmitted by the network device using multiple downlink transmitting beams to obtain a downlink measured result; and determining, by the terminal device, a correspondence result of transmitting/receiving beam correspondence according to the $M_1$ metric information sets and the downlink measured result.

The metric value information of the first uplink beam pair, which is formed by the first uplink transmitting beam and the first uplink receiving beam, may be obtained by the network device using the first uplink receiving beam to measure an uplink signal transmitted by the terminal device using the first uplink transmitting beam. Optionally, the metric information of the first uplink beam pair may be determined by the network device according to the measured value corresponding to the first uplink beam pair.

Optionally, the metric value information corresponding to the first uplink transmitting beam may be obtained by the network device using each of the multiple uplink receive beams to measure the uplink signal transmitted by the terminal device using the first uplink transmitting beam. Optionally, the metric value information corresponding to the first uplink transmitting beam may be determined by the network device according to the measured value corresponding to each of the multiple uplink beam pairs formed by the first uplink transmitting beam and the multiple uplink receiving beams.

In an embodiment, the multiple uplink transmitting beams of the terminal device include the $M_1$ uplink transmitting beams, and the multiple uplink receiving beams of the network device include the $M_2$ uplink receiving beams.

Optionally, the correspondence result of transmitting/receiving beam correspondence may include: whether the transmitting/receiving beam correspondence is established and/or at least one transmitting/receiving beam pair that satisfies the beam correspondence.

According to the wireless communication method provided by the embodiment of the present disclosure, the uplink signal, transmitted by the terminal device using multiple uplink transmitting beams, is measured by the network device, and $M_1$ metric information sets corresponding to $M_1$ uplink transmitting beams are transmitted to the terminal device, and the first metric information set corresponding to the first uplink transmitting beam include at least one of the following: identification information of the first uplink transmitting beam, metric value information corresponding to the first uplink transmitting beam, and identifier information of each of the $M_2$ uplink receiving beams of the network device, metric value information of each of the $M_2$ uplink beam pairs formed by the first uplink transmitting beam and the $M_2$ uplink receiving beams, the terminal device determines the correspondence result of the transmitting/receiving beam correspondence based on the $M_1$ metric information sets and the downlink measured results obtained by measuring the uplink signal transmitted by the network device using multiple downlink transmitting beams, which is beneficial to reduce signaling overhead and has better accuracy.

In a first possible implementation of the first aspect, the determining, by the terminal device, a correspondence result of transmitting/receiving beam correspondence according to the $M_1$ metric information sets and the downlink measured result, includes: determining, by the terminal device, the correspondence result of transmitting/receiving beam correspondence at the terminal device according to the $M_1$ metric information sets and the downlink measured result; and/or determining, by the terminal device, the correspondence result of transmitting/receiving beam correspondence at the network device according to the $M_1$ metric information sets and the downlink measured result.

In combination with the above possible implementation of the first aspect, in a second possible implementation of the first aspect, the method further includes: transmitting, by the terminal device, correspondence indication information to the network device, the correspondence indication information being indicative of the correspondence result of transmitting/receiving beam correspondence.

In combination with the above possible implementation of the first aspect, in a third possible implementation of the first aspect, prior to the transmitting, by a terminal device, an uplink signal to a network device by using each of multiple uplink transmitting beams, the method further includes: confirming by the terminal device, when a time interval between a current first time instant and a second time instant prior to the first time instant reaches a preset time interval, to perform the determining a correspondence result of transmitting/receiving beam correspondence, wherein the second time instant is a neighboring start time closest to when it is determined the transmitting/receiving beam correspondence is established.

Optionally, if it is determined that the transmitting/receiving beam correspondence is established, the transmitting/receiving beam correspondence may be deemed by the network device and the terminal device as being held within a preset time interval; and when the preset time interval is reached, the network device and the terminal device may determine whether the transmitting/receiving beam correspondence is still established.

In combination with the above possible implementation of the first aspect, in a fourth possible implementation of the first aspect, prior to the transmitting, by a terminal device, an uplink signal to a network device by using each of multiple uplink transmitting beams, the method further includes: confirming by the terminal device, when the terminal device needs to change a transmission mode or a transmission parameter used for data transmission with the network device, to perform the determining a correspondence result of transmitting/receiving beam correspondence.

Optionally, the terminal device may determine, based on a current state, for example, a current channel state of the network device and the terminal device, that a transmission mode or a transmission parameter for performing data transmission with the terminal device needs to be changed. Optionally, the terminal device may also determine, based on an indication of the network device, that a transmission mode or a transmission parameter used for data transmission with the network device needs to be changed.

In combination with the above possible implementation of the first aspect, in a fifth possible implementation of the first aspect, prior to the transmitting, by a terminal device, an uplink signal to a network device by using each of multiple uplink transmitting beams, the method further includes: receiving, by the terminal device, configuration indication information transmitted by the network device, wherein the configuration indication information is indicative of configuration for the terminal device to transmit the uplink signal; the transmitting, by a terminal device, an uplink signal to a network device by using each of multiple uplink transmitting beams includes: transmitting, by the terminal device, the uplink signal to the network device by using each of the multiple uplink transmitting beams based on the configuration indication information.

In combination with the above possible implementation of the first aspect, in a sixth possible implementation of the first aspect, the transmitting, by a terminal device, an uplink signal to a network device by using each of multiple uplink transmitting beams includes: transmitting, by the terminal device, the uplink signal to the network device by using each of the multiple uplink transmitting beams based on original configuration, the original configuration being used by the terminal device to transmit an uplink signal to the network device in a previous process of the determining a correspondence result of transmitting/receiving beam correspondence.

In a second aspect, a wireless communication method is provided, including: measuring, by a network device using multiple uplink receiving beams, an uplink signal transmitted by a terminal device using each of multiple uplink transmitting beams to obtain an uplink measured result; transmitting, by the network device, $M_1$ metric information sets corresponding to $M_1$ uplink transmitting beams to the terminal device based on the uplink measured result, a first metric information set corresponding to a first uplink transmitting beam among the $M_1$ uplink transmitting beams comprising at least one of: metric value information corresponding to the first uplink transmitting beam, and metric value information of each of $M_2$ uplink beam pairs formed by the first uplink transmitting beam and $M_2$ uplink receiving beams of the network device, wherein the multiple uplink transmitting beams comprise the $M_1$ uplink transmitting beams, the multiple uplink receiving beams comprise the $M_2$ uplink receiving beams, and a first uplink beam pair is formed by the first uplink transmitting beam and a first uplink receiving beam of the $M_2$ uplink receiving beams, a metric value of the first uplink beam pair is obtained by the network device measuring, by means of the first uplink receiving beam, an uplink signal transmitted by the terminal device using the first uplink transmitting beam, $M_1$ and $M_2$ being integers greater than or equal to 1, and at most one of $M_1$ and $M_2$ being equal to 1.

In a first possible implementation of the second aspect, the method includes: transmitting, by the network device, a downlink signal by using each of multiple downlink transmitting beams.

In combination with the above possible implementation of the second aspect, in a second possible implementation of the second aspect, the method includes: receiving, by the network device, a correspondence indication information transmitted by the terminal device, the correspondence indication information being indicative of the correspondence result of transmitting/receiving beam correspondence.

In combination with the above possible implementation of the second aspect, in a third possible implementation of the second aspect, prior to the measuring, by a network device using multiple uplink receiving beams, an uplink signal transmitted by a terminal device using each of multiple uplink transmitting beams, the method further includes: transmitting, by the network device, configuration indication information to the terminal device, wherein the configuration indication information is indicative of configuration for the terminal device to transmit the uplink signal.

In a third aspect, a wireless communication device is provided for performing the method according to the above first aspect or any possible implementation of the first aspect.

In an embodiment, the device includes units for performing the method according to the above first aspect or any possible implementations of the first aspect.

In a fourth aspect, a wireless communication device is provided for performing the method according to the above second aspect or any possible implementation of the second aspect.

In an embodiment, the device includes units for performing the method according to the above second aspect or any possible implementations of the second aspect.

In a fifth aspect, a wireless communication device is provided, including a memory and a processor, wherein the memory is used for storing instructions and the processor is configured to execute instructions stored in the memory. When the processor executes the instructions stored in the memory, the execution causes the processor to perform the method according to the first aspect or any possible implementation of the first aspect.

In a sixth aspect, a wireless communication device is provided, including a memory and a processor, wherein the memory is used for storing instructions and the processor is configured to execute instructions stored in the memory. When the processor executes the instructions stored in the memory, the execution causes the processor to perform the method according to the second aspect or any possible implementation of the second aspect.

In a seventh aspect, a computer readable medium is provided for storing a computer program, the computer program includes instructions for performing the method according to the first aspect or any possible implementation of the first aspect.

In an eighth aspect, a computer readable medium is provided for storing a computer program, the computer program includes instructions for performing the method according to the second aspect or any possible implementation of the second aspect.

In certain aspects of embodiments of the disclosure, the metric value corresponding to the first uplink transmitting beam is specifically a metric value of an uplink beam pair corresponding to a maximum value in a first measured value set, the first measured value set is obtained by the network device measuring, by means of multiple uplink receiving beams, an uplink signal transmitted by the terminal device using the first uplink transmitting beam.

The uplink signal, transmitted by the terminal device using the first uplink transmitting beam, is measured by the network device using multiple uplink receive beams to obtain a first set of measured values. It is assume that the measured value corresponding to the first uplink beam pair is the maximum value in the first measured value set, and the metric value corresponding to the first uplink transmitting beam may be the metric value of the first uplink beam pair. The metric value of the first uplink beam pair is obtained based on the measured value corresponding to the first uplink beam pair.

In certain aspects of embodiments of the disclosure, the first measured values set includes at least one of: a signal strength, a SNR, a SINR, and a rank value.

In certain aspects of embodiments of the disclosure, the $M_2$ uplink beam pairs are preceding $M_2$ uplink beam pairs having higher metric value among multiple uplink beam pairs, wherein the multiple uplink beam pairs are formed by the first uplink transmitting beam and multiple uplink receiving beams of the network device.

In certain aspects of embodiments of the disclosure, if the first uplink beam pair is an uplink beam pair having the maximum metric value among multiple uplink beam pairs, wherein the multiple uplink beam pairs are formed by the first uplink transmitting beam and multiple uplink receiving beams of the network device; the $M_2$ uplink receiving beams further include at least one second uplink receiving beam, at least a second uplink beam pair is formed by the at least one second uplink receiving beam and the first uplink transmitting beam, and a difference value between a metric value of each of the at least one second uplink beam pair and a metric value of the first uplink beam pair is less than a first threshold.

In certain aspects of embodiments of the disclosure, the at least one second uplink beam pair includes preceding $M_2-1$ uplink beam pairs having higher metric value among the multiple uplink beam pairs other than the first uplink beam pair.

In certain aspects of embodiments of the disclosure, a metric value information of a second uplink beam pair among the $M_2$ uplink beam pairs includes a difference value between a measured value corresponding to the second uplink beam pair and a measured value corresponding to an uplink beam pair prior to the second uplink beam pair; or a metric value information of the second uplink beam pair among the $M_2$ uplink beam pairs includes a difference value between a measured value corresponding to the second uplink beam pair and a measured value corresponding to a first-ranked uplink beam pair in the multiple uplink beam pairs.

Optionally, an uplink beam pair ranked at the first place may be the uplink beam pair having the maximum metric value, or having the minimum metric value or having the minimum serial number among the multiple uplink beam pair.

In certain aspects of embodiments of the disclosure, the $M_1$ uplink transmitting beams are preceding $M_1$ uplink transmitting beams having higher metric value among the multiple uplink transmitting beams.

In certain aspects of embodiments of the disclosure, if the first uplink transmitting beam is an uplink transmitting beam having a maximum metric value among the multiple uplink transmitting beams, the $M_1$ uplink transmitting beams further include at least one second uplink transmitting beam, a difference value between a metric value, corresponding to each of the at least one second uplink transmitting beam, and a metric value corresponding to the first uplink transmitting beam is less than a second threshold.

In certain aspects of embodiments of the disclosure, at least one second uplink transmitting beam includes preceding $M_1-1$ uplink transmitting beam having higher metric value among the multiple uplink transmitting beams other than the first uplink transmitting beam.

In certain aspects of embodiments of the disclosure, the corresponding indication information is specifically indicative of at least one of: whether the transmitting/receiving beam correspondence is established at the terminal device; whether the transmitting/receiving beam correspondence is established at the network device; at least one transmitting/receiving beam pair satisfying beam correspondence included by the terminal device; and at least one transmitting/receiving beam pair satisfying beam correspondence included by the network device.

In certain aspects of embodiments of the disclosure, the configuration indication information is indicative of at least one of the following configuration parameters: a measurement order of the multiple uplink transmitting beams, a number of repeated measurements of the multiple uplink transmitting beams, a correspondence between the multiple uplink transmitting beams and at least one uplink signal, and a correspondence between the multiple uplink transmitting beams and transmission resource.

In certain aspects of embodiments of the disclosure, the uplink signal includes at least one of: a SRS, a PRACH, a DMRS, and a dedicated uplink signal for beam measurement.

DETAILED DESCRIPTION

The technical solutions in the embodiments of the present disclosure will be described below with reference to the accompanying drawings in the embodiments of the present disclosure.

The technical solution of the embodiment of the present disclosure may be applied to various communication systems, such as Global System of Mobile communication (GSM) system, Code Division Multiple Access (CDMA) System, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system, future evolution of Public Land Mobile Network (PLMN) or future 5G systems, etc.

Figure 1:
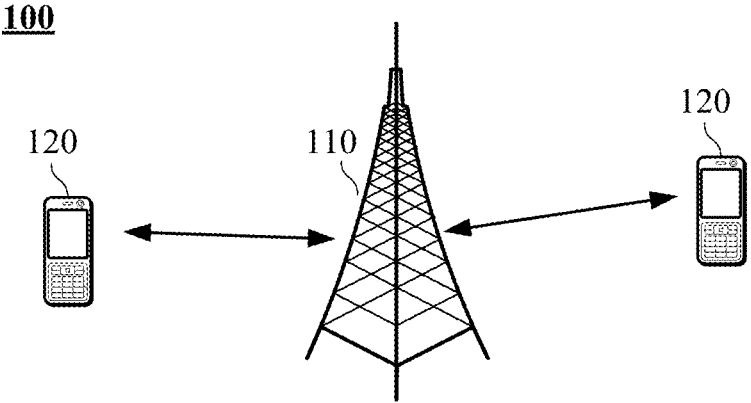
FIG. 1 is a schematic structural diagram illustrating a wireless communication system applied to an embodiment of the present disclosure.

FIG. 1 illustrates a wireless communication system 100 applied to an embodiment of the present disclosure. The wireless communication system 100 may include at least one network device 110. The network device 110 may communicate with a terminal device. Each network device 110 may provide communication coverage for a particular geographic area and may communicate with terminal devices (e.g., UEs) located within the coverage area. The network device 110 may be a Base Transceiver Station (BTS) in a GSM system or a CDMA system, or may be a NodeB (NB) in a WCDMA system, or may be an Evolutional Node B (eNB or eNodeB) in an LTE system, or a radio controller in a Cloud Radio Access Network (CRAN), or the network device may be a relay station, an access point, an in-vehicle device, a wearable device, a network side device in future 5G network, a transmission point, or a network device in a future evolved PLMN.

The wireless communication system 100 also includes a plurality of terminal devices 120 located within the coverage of the network device 110. The terminal device 120 may be mobile or fixed. The terminal device 120 may refer to an access terminal, a User Equipment (UE), a subscriber unit, a subscriber station, a mobile station, a mobile terminal, a remote station, a remote terminal, a mobile device, a user terminal, a terminal, a wireless communication device, and a user agent or user device. The access terminal may be a cellular phone, a cordless phone, a Session Initiation Protocol (SIP) phone, a Wireless Local Loop (WLL) station, a Personal Digital Assistant (PDA), a handheld device with wireless communication function, a computing device or other processing devices connected to a wireless modem, an in-vehicle devices, a wearable device, a terminal device in future 5G networks, or a terminal device in future evolved PLMNs, and the like.

FIG. 1 schematically illustrates one network device and two terminal devices. Optionally, the wireless communication system 100 may include a plurality of network devices and may include other numbers of terminal devices within the coverage of each network device, and the embodiment does not limit this.

Optionally, the wireless communication system 100 may further include a network controller, a mobility management entity, and other network entities, and the embodiment of the present disclosure is not limited thereto.

The wireless communication system 100 may adopt multiple beam techniques. Specifically, for the downlink, the network device may have multiple downlink transmitting beams (DL Tx Beam), and the terminal device may have multiple downlink receiving beams (DL Rx Beam); for the uplink, the terminal device may have multiple uplink transmitting beams (UL Tx Beam), the network device may have multiple uplink receiving beams (UL Rx Beam).

For ease of understanding, it is assumed here that the terminal device has $U_1$ uplink transmitting beams and $D_1$ downlink receiving beams, and the network device has $U_2$ uplink receiving beams and $D_2$ uplink transmitting beams, wherein $U_1$, $U_2$, $D_1$ and $D_2$ are all integers greater than 1.

In the communication process, the network device and the terminal device need to separately determine the beam currently used for downlink transmission and the beam currently used for uplink transmission, which cause large signaling overhead and heavy burden on the equipment.

Specifically, for the selection of the beam for downlink transmission, the network device needs to transmit $D_1$ downlink uplink signals to the terminal device using each of all downlink transmitting beams. The terminal device may separately measure, by using $D_1$ downlink receiving beams, $D_1$ downlink uplink signals transmitted by the network device using the same downlink transmitting beam, to obtain $D_1$ measured values. In this way, the terminal device needs to perform $D_1 \times D_2$ measurements to obtain $D_1 \times D_2$ measured values, and determine the currently used downlink transmitting beam and downlink receiving beam from all downlink transmitting beams and downlink receiving beams based on the obtained set of measured values.

Similarly, for the selection of the beam for uplink transmission, the terminal device needs to transmit uplink signals to the network device using each of all uplink transmitting beams. The network device needs to perform, by using each of all uplink receiving beams, one measurement on each of the uplink transmitting beams of the terminal device to obtain multiple measured values, and determine the currently used uplink transmitting beam and uplink receiving beam from multiple uplink transmitting beams and uplink receiving beams based on the obtained set of measured values.

In order to reduce the signaling overhead and the burden on the equipment caused by beam selection, it may be determined whether the transmitting/receiving beam correspondence is established. If the transmitting/receiving beam correspondence is established, the beam for downlink transmission may be determined based on the beam for uplink transmission, or the beam for uplink transmission may be determined based on the beam for downlink transmission. In this way, the network device and the terminal device only need to perform beam selection in one link direction to obtain a beam for data transmission in another link direction, which reduce signaling overhead and the burden on the equipment.

Optionally, if at least one of the following conditions is satisfied, the transmitting/receiving uplink beam correspondence is established at the terminal device.

As condition 1, the terminal device is capable of determining the UL Tx beam for uplink transmission based on measurement of the one or more DL Rx beams by the terminal device.

As condition 2, the terminal device is capable of determining the DL Rx beam for downlink transmission based on an indication of the network device, wherein the indication of the network device is based on measurement of one or more UL Tx beams by the terminal device.

Optionally, if at least one of the following conditions is satisfied, the transmitting/receiving uplink beam correspondence is established at the network device.

As condition 1, the network device is capable of determining the UL Rx beam for uplink transmission based on the measurement of the one or more DL Tx beams of the network device by the terminal device.

As condition 2, the network device is capable of determining the DL Tx beam for downlink transmission based on measurements of one or more UL Rx beams by the network device.

The technical solution for determining the transmitting/receiving beam correspondence provided by the embodiment of the present disclosure will be described in detail below with reference to specific examples.

Figure 2:
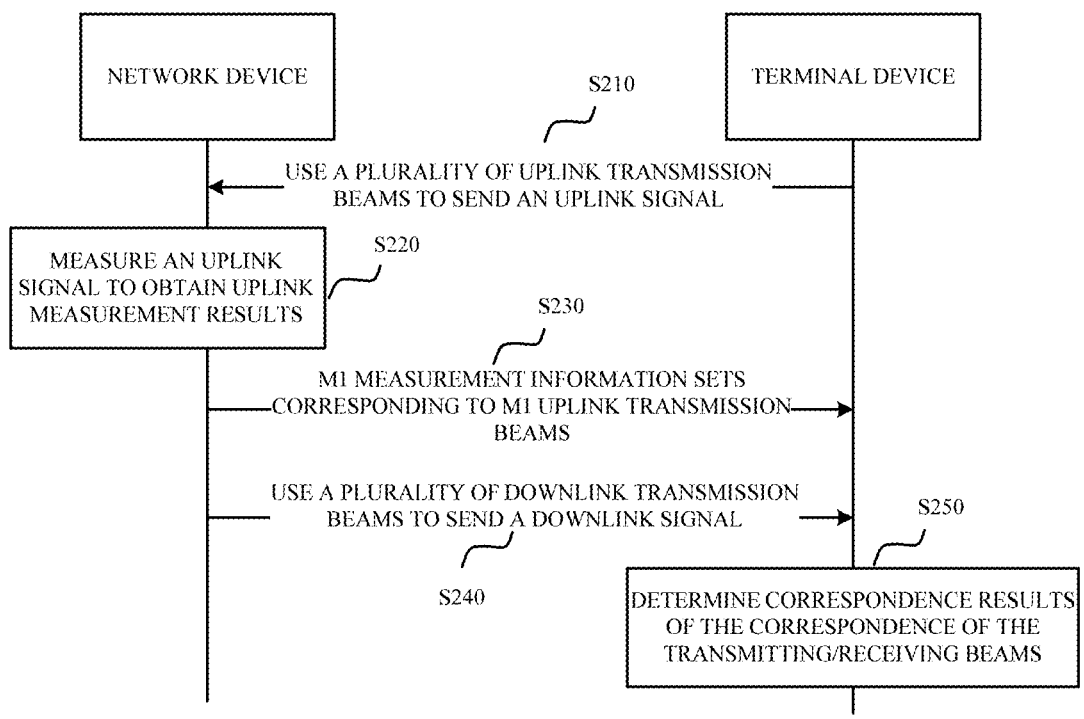
FIG. 2 is a schematic flowchart illustrating a wireless communication method according to an embodiment of the present disclosure.

FIG. 2 illustrates a wireless communication method 200 according to an embodiment of the present disclosure. The wireless communication method 200 may be applied to the wireless communication system 100 shown in FIG. 1, but the embodiment of the present disclosure is not limited thereto.

In step S210, the terminal device transmits an uplink signal to a network device by using each of the multiple uplink transmitting beams.

It is assumed that the terminal device has $U_1$ uplink transmitting beams and $D_1$ downlink receiving beams, and the network device has $U_2$ uplink receiving beams and $D_2$ downlink transmitting beams, wherein the $U_1$ uplink transmitting beams and the $D_1$ downlink receiving beams may have a certain mapping relationship, which may be a one-to-one mapping, a one-to-many mapping, or a many-to-many mapping. For example, the terminal device may include $U_1$ beams, and each of the $U_1$ beams may serve as either an uplink transmitting beam or a downlink receiving beam. In this case, $D_1$ is equal to $U_1$ and the downlink receiving beam, to which each uplink transmitting beam is mapped, is the uplink transmitting beam itself, but the embodiment of the present disclosure is not limited thereto.

Optionally, the number of the multiple uplink transmitting beams may be the number of the uplink transmitting beams that the terminal device needs to measure, and the multiple uplink transmitting beams may be part or all of the uplink transmitting beams of the $U_1$ uplink transmitting beams of the terminal device, but the embodiment of the present disclosure is not limited thereto.

Optionally, the terminal device may transmit at least one uplink signal to the network device by using each of the $U_1$ uplink transmitting beams. Optionally, the number of the uplink signals transmitted by the terminal device to the network device by means of different uplink transmitting beams may be the same or different. For the sake of understanding, the following description is made by taking the example that the terminal device may transmit the $U_2$ uplink signals to the network device using each uplink transmitting beam. However, the embodiment of the present disclosure is not limited thereto.

Optionally, the type of uplink signal, transmitted by the terminal device to the network device using different uplink transmitting beams, may be the same or different, and the at least one uplink signal, transmitted by the terminal device to the network device using the same uplink transmitting beam, may be of the same type or different types. For the uplink signal, for example, the terminal device may repeatedly transmit the uplink signal to the network device using each uplink transmit beam, but the embodiment of the present disclosure is not limited thereto.

Optionally, the uplink signal transmitted by the terminal device using multiple uplink transmitting beams may include at least one of the following uplink signals: a sounding reference signal (SRS), a physical random access channel (PRACH), a demodulation reference signal (DMRS), and a dedicated uplink signal for beam measurement.

Herein, the dedicated uplink signal for beam measurement may be an uplink signal dedicated to beam measurement specially. Optionally, the uplink signal transmitted by the terminal device may also include other type of signal, but the embodiment of the present disclosure is not limited thereto.

In step S210, the configuration, in which the terminal device transmits the uplink signal to the network device, may be defined by a protocol, or may be an original configuration of the terminal device, for example, a configuration is adopted by the terminal device in performing beam selection or determining a transmitting/receiving beam correspondence. It may also be dynamically configured by the network device, which is not limited in this embodiment of the present disclosure.

Optionally, before step S210, the method 200 further includes: transmitting, by the network device, configuration indication information to the terminal device, wherein the configuration indication information is indicative of configuration for the terminal device to transmit the uplink signal. At this time, the terminal device, when receiving the configuration indication information transmitted by the network device, may transmit the uplink signal to the network device using each of the multiple uplink transmitting beams according to the configuration indication information.

Specifically, if the configuration indication information indicates all configuration parameters required for the terminal device to transmit the uplink signal, in step S210, the terminal device may transmit the uplink signal using the configuration parameter indicated by the configuration indication information. Optionally, if the configuration indication information indicates a part of configuration parameters required for the terminal device to transmit the uplink signal, the terminal device may further determine, according to the protocol specification or the original configuration, configuration parameters not indicated by the configuration indication information, but the embodiment of the disclosure are not limited thereto.

Optionally, the configuration indication information may be indicative of at least one of the following configuration parameters: a measurement order of the uplink transmitting beam, a number of repeated measurements of the uplink transmitting beam, a correspondence between the multiple uplink transmitting beams and the uplink signal, and a correspondence between the multiple uplink transmitting beams and transmission resource.

Optionally, the configuration indication information may be used for indicating the measurement order of the uplink transmitting beam, that is, the order in which the terminal device transmits the uplink signal using the multiple uplink transmitting beams. Optionally, the configuration indication information may be used for the number of repeated measurements of the uplink transmitting beam. Specifically, the number of repeated measurements of the uplink transmitting beam is indicative of the number of uplink signals transmitted by the terminal device to the network device using the uplink transmitting beam. Optionally, the number of repeated measurements of different uplink transmitting beams among the multiple uplink transmitting beams may be the same or different, which is not limited in this embodiment of the present disclosure. Optionally, the configuration indication information may also be indicative of a correspondence between the multiple uplink transmitting beams and multiple uplink signals. At this time, the terminal device may determine, according to the correspondence between the uplink transmitting beam and the uplink signal, the type of the uplink signal transmitted by using each of the multiple uplink transmitting beams. Optionally, any two different uplink transmitting beams may be used to transmit the same or different uplink signals, but the embodiment of the present disclosure is not limited thereto. Optionally, the configuration indication information may also be indicative of a correspondence between the multiple uplink transmitting beams and transmission resource. At this time, the terminal device may determine, according to the correspondence between the uplink transmitting beam and the transmission resource, the transmission resource corresponding to the uplink signal transmitted by each of the multiple uplink transmitting beams, and transmit, by means of the uplink transmitting beam, the uplink signal on the corresponding transmission resource. Optionally, the terminal device may occupy the same or different transmission resource when the uplink signal is transmitted by means of any two different uplink transmitting beams, but the embodiment of the present disclosure is not limited thereto.

Optionally, the configuration indication information may also be indicative of other configuration parameters, but the embodiment of the present disclosure is not limited thereto.

For the sake of understanding, the following is an example in which the terminal device uses each uplink transmitting beam to transmit $U_2$ uplink signals to the network device as an example, but the embodiment of the present disclosure is not limited thereto.

In step S220, the network device measures, by means of multiple uplink receiving beams, an uplink signal transmitted by the terminal device using each of multiple uplink transmitting beams to obtain an uplink measured result.

The number of the multiple uplink receiving beams may be the number of uplink receiving beams that the network device needs to measure. The multiple uplink receiving beams may be part or all of the uplink receiving signals of the $U_2$ uplink receiving beams of the network device, which is not limited in this embodiment of the present disclosure.

Specifically, for the $U_2$ uplink signals transmitted by the terminal device using the first uplink transmitting beam among the multiple uplink transmitting beams, the network device may perform one measurement, by means of each of the $U_2$ uplink receiving beams, to obtain the measured value corresponding to the uplink beam pair formed by the first uplink transmitting beam and each uplink receiving beam. Optionally, if the number of uplink signals transmitted by the terminal device using the first uplink transmitting beam is less than $U_2$, the network device may perform, by means of the same number of the uplink receiving beams, one measurement separately on the signal transmitted by the terminal device using the first uplink transmitting beam, to obtain the measured value corresponding to each of the uplink beam pairs formed by the multiple uplink receiving beams and the first uplink transmitting beam.

Specifically, it is assumed that the first uplink beam pair is formed by the first uplink transmitting beam of the network device and the first uplink transmitting beam of the terminal device, and the measured value corresponding to the first uplink beam pair may be obtained by the network device measuring, by means of using a first uplink receiving beam, the uplink signal transmitted by the terminal device using the first uplink transmitting beam. In this way, the uplink signal, transmitted by the terminal device using the first uplink transmitting beam, is measured by means of multiple uplink receiving beams, to obtain a first measured value set by the network device. Wherein, the first measured value set may include the measured values corresponding to each of the multiple uplink beam pairs formed by the first uplink transmitting beam and the multiple uplink receiving beams, the multiple uplink receiving beams may be part or all of the $U_2$ uplink receiving beams, which is not limited in this embodiment of the present disclosure.

Optionally, the measured value corresponding to the uplink beam pair may include at least one of: a signal strength, a signal to noise ratio (SNR), and a signal-to-interference and noise ratio (SINR) and a rank value. For example, the measured value corresponding to the uplink beam pair may be specifically one of: the signal strength, the SNR, the SINR, the signal strength and channel rank value, the SNR and channel rank value, the SINR and the channel rank value. Optionally, the measured value corresponding to the uplink beam pair may also include the measured value obtained by measuring the other physical quantity, which is not limited in this embodiment of the present disclosure.

Optionally, the network device may further obtain, based on the measured values corresponding to the multiple uplink beam pairs formed by the first uplink transmitting beam, a metric value of each of the multiple uplink beam pairs, so that the first metric value set corresponding to the first uplink transmitting beam may be obtained by the network device. Optionally, the metric value of the uplink beam pair may be a function of the measured value corresponding to the uplink beam pair. For example, the metric value of an uplink beam pair may be equal to the measured value corresponding to the uplink beam pair, or the metric value of an uplink beam pair may be equal to a weighted average of multiple measured values of the uplink beam pair, the multiple measured values may be measured values corresponding to different measured quantities of the uplink beam pair, but the embodiment of the present disclosure is not limited thereto.

Optionally, the network device may further determine, based on the first measured value set, the metric value corresponding to the first uplink transmitting beam. The metric value corresponding to the first uplink transmitting beam may be obtained by the network device measuring, by means of each of the multiple uplink receiving beams, the uplink signal transmitted by the terminal device using the first uplink transmitting beam, specifically, the metric value corresponding to the first uplink transmitting beam may be obtained based on the metric value of each of the multiple uplink beam pairs formed by the first uplink transmitting beam and the multiple uplink receiving beams. Optionally, the metric value corresponding to the first uplink transmitting beam may be the metric value of the uplink beam pair having the maximum measured value among the multiple uplink beam pairs formed by the first uplink transmitting beam, that is, the maximum value in the first metric value set; or the metric value corresponding to the first uplink transmitting beam may be a mathematical mean or a weighted average of at least two metric values in the first metric value set, but the embodiment of the present disclosure is not limited to this.

Optionally, the uplink signal, transmitted by each of the multiple uplink transmitting beams, is measured by the network device, to obtain a measured value set corresponding to each uplink transmitting beam, and $M_1$ uplink transmitting beams are determined from the multiple uplink transmitting beams based on the measured value set corresponding to each of the multiple uplink transmitting beams. Wherein, the $M_1$ may be an integer greater than or equal to 1, and the $M_1$ may be less than or equal to the number of the multiple uplink transmitting beams, that is, the $M_1$ uplink transmitting beams may be specifically all or part of the multiple uplink transmitting beams of the terminal device, but the embodiment of the present disclosure is not limited to this.

Specifically, the metric value, corresponding to each uplink transmitting beam, may be determined by the network device based on the measured value set corresponding to each of the uplink transmitting beams, wherein the determination method may refer to the above description of the first uplink transmitting beam, and thus are not described herein for brevity.

Optionally, $M_1$ uplink transmitting beams are determined by the network device from the multiple uplink transmitting beams based on the metric value corresponding to each of the multiple uplink transmitting beams. As an optional embodiment, the $M_1$ uplink transmitting beams may be the preceding $M_1$ uplink transmitting beams having the higher metric values among the multiple uplink transmitting beams. For example, the multiple uplink transmitting beams are ranked in order of the metric values by the network device, and the preceding $M_1$ uplink transmitting beams are selected, but the embodiment of the present disclosure is not limited thereto.

As another optional embodiment, if the first uplink transmitting beam is an uplink transmitting beam having the maximum metric value among the multiple uplink transmitting beams, the $M_1$ uplink transmitting beams may include the first uplink transmitting beam and at least a second uplink transmitting beam, wherein a difference value, between the metric value corresponding to each of the at least one second uplink transmitting beam and the metric value corresponding to the first uplink transmitting beam, may be smaller than a second threshold. Specifically, the network device may firstly determine the uplink transmitting beam having the maximum metric value among the multiple uplink transmitting beams, which is referred to herein as a first uplink transmitting beam. Then, the metric value corresponding to the first uplink transmitting beam with the metric value corresponding to the remaining uplink transmitting beam are compared by the network device, and at least one uplink transmitting beam having the difference value from the maximum metric value that is less than the second threshold, is determined from the remaining uplink transmit beams, which is referred to herein as a second uplink transmitting beam, wherein the remaining uplink transmitting beams may be specifically uplink transmitting beam other than the first uplink transmitting beam among the multiple uplink transmitting beams.

Optionally, the second threshold may be specified by the protocol, or may be determined by the network device according to the current network state or other parameters, or may be determined by the network device and the terminal device, but the embodiment of the present disclosure is not limited thereto.

Optionally, the at least one second uplink transmitting beam may be all or part of the remaining uplink transmitting beams having the maximum metric value being less than the second threshold. As an optional embodiment, all of the remaining uplink transmitting beams having the maximum metric value being less than the second threshold, is determined as the at least one second uplink transmitting beam by the network device. As another optional embodiment, if the number of all of the remaining uplink transmitting beams having the maximum metric value being less than the second threshold is greater than $M_1-1$, the preceding $M_1-1$ uplink transmitting beams having the higher metric values among the remaining uplink transmitting beams are determined as the at least one second uplink transmitting beam by the network device, but the embodiment of the present disclosure is not limited thereto.

Optionally, the $M_1$ uplink transmitting beam is determined from the multiple uplink transmitting beams by the network device in other ways, but the embodiment of the present disclosure is not limited thereto.

Optionally, if the $M_1$ uplink transmitting beams include the first uplink transmitting beam, The metric value of each uplink beam pair determines $M_2$ uplink beam pairs are determined from the multiple uplink beam pairs by the network device based on the first metric value, that is, based on the metric value of each of the multiple uplink beam pairs formed by the first uplink transmitting beam and the multiple uplink receiving beams. $M_2$ may be an integer greater than or equal to 1, and $M_2$ may be less than or equal to the number of the multiple uplink receiving beams, that is, the uplink receiving beam among the $M_2$ uplink beam pairs may be specifically all or part of the multiple uplink receiving beams, but the embodiment of the present disclosure is not limited thereto.

As another optional embodiment, the $M_2$ uplink beam pairs are the preceding $M_2$ uplink beam pairs having the higher metric value corresponding to the multiple uplink beam pairs formed by the first uplink transmitting beam.

As another optional embodiment, it is assumed that the first uplink beam pair is an uplink beam pair having the maximum metric value among the multiple uplink beam pairs formed by the first uplink transmitting beam, and the $M_2$ uplink beam pairs may include a first uplink beam pair and at least one second uplink beam pair, wherein a difference value between the metric value of the uplink beam pair formed by each of a second uplink receiving beam and the first uplink transmitting beam and the metric value corresponding to the first uplink beam pair is less than a first threshold. Specifically, an uplink beam pair, having the maximum metric value among the multiple uplink beam pairs formed by the first uplink transmitting beam, is determined firstly by the network device and an uplink receiving beam having the maximum metric value among the uplink beam pair is determined, which is referred to herein as the first uplink receiving beam. Then at least one second uplink beam pair may be determined by the network device from the remaining uplink beam pair, determining that the difference value between the maximum metric value and the maximum metric value is less than the first threshold value by comparing the metric value of the first uplink beam pair and the metric value of the remaining uplink beam pair. And an uplink receiving beam among each of the at least one second uplink beam pair is determined, which is referred to herein as the second uplink receiving beam, wherein the remaining uplink beam pair may be specifically the uplink beam pair among the multiple uplink beam pairs formed by the first uplink transmitting beam other than the first uplink beam pair.

Optionally, the first threshold may be specified by the protocol, or may be determined by the network device according to the current network state or other parameters, or may be determined by the network device and the terminal device, but the embodiment of the present disclosure is not limited thereto.

Optionally, the at least one second uplink beam pair may be all or part of uplink beam pairs whose difference from the maximum metric value is less than the first threshold in the remaining uplink beam pairs. As an optional embodiment, all uplink beam pairs, in which the difference between the remaining uplink beam pairs and the maximum metric value is less than the first threshold value, is determined as the at least one second uplink beam pair by the network device. As another optional embodiment, if the number of all uplink beam pairs whose difference from the maximum metric value is less than the first threshold in the remaining uplink beam pairs is greater than $M_2-1$, the preceding $M_2-1$ uplink beam pairs having the higher metric values in the remaining uplink beam pairs may be determined as the at least one second uplink beam pair by the network device, but the embodiment of the present invention is not limited thereto.

Optionally, the $M_2$ uplink beam pairs are determined from the multiple uplink beams pairs formed by the first uplink transmitting beam by the network device in other ways, but the embodiment of the present disclosure is not limited thereto.

Similarity, Ki uplink beam pairs may be determined, based on the metric value of each of Pi uplink beam pairs formed by the uplink transmitting beam i of the $M_1$ uplink transmitting beams, by the network device from the Pi uplink beam pairs, and in the metric information set i corresponding to the uplink transmitting beam i transmitted to the terminal device, the metric value information corresponding to the uplink transmitting beam i and/or the metric value information of each of the determined Ki uplink beam pairs may be included. Wherein i may take a value from 1 to $M_1$, Pi may be an integer greater than or equal to 2, and Ki may be an integer greater than or equal to 1. For specific implementation, reference may be made to the first uplink transmitting beam and thus are not described herein for brevity.

In step S230, the $M_1$ metric information sets corresponding to the $M_1$ uplink transmitting beams are transmitted to the terminal device by the network device, and the first metric information set, corresponding to the first uplink transmitting beam in the $M_1$ uplink transmitting beams, includes at least one of: the identification information of the first uplink transmitting beam, the metric value information corresponding to the first uplink transmitting beam, the identification information of each of the $M_2$ uplink receiving beams of the network device, and the metric value information of each of the $M_2$ uplink beam pairs formed by the $M_2$ uplink receiving beams and the first uplink transmitting beam, wherein at most one of $M_1$ and $M_2$ are equal to 1.

Optionally, the metric value information of each of the $M_2$ uplink beam pairs may be specifically a metric value of each uplink beam pair. Optionally, the metric value information of an uplink beam pair may include a difference value between the metric value of the uplink beam pair and a preset reference value. Optionally, the metric value information of the $M_2$ uplink beam pairs may be sequentially arranged in a certain order, for example, arranged according to the magnitude of the metric value of the uplink beam pair, or arranged sequentially according to the number of the uplink receiving beam included in the uplink beam pair, etc. At this time, the metric value information of an uplink beam pair may include a difference value between the metric value of the uplink beam pair and the metric value of the preceding uplink beam pair. Optionally, the metric value information of the first-ranked uplink beam pair may be null or set to a default value or a meaningless value, which is not limited in this embodiment of the present disclosure. Optionally, the metric value information of an uplink beam pair may include a difference value between a metric value of the uplink beam pair and a metric value of an uplink beam pair ranked first or last. Optionally, the metric value information of an uplink beam pair may include a difference value between the metric value of the uplink beam pair and a maximum or minimum value of the metric values of the $M_2$ uplink beam pairs. Optionally, the metric value information corresponding to an uplink beam pair as a reference (e.g., the foregoing uplink beam pair ranked first or last or the uplink beam pair corresponding to the maximum metric or the minimum metric) may be null or set to a default value or a meaningless value, which is not limited in this embodiment of the present disclosure.

In the embodiment of the present disclosure, at most one of $M_1$ and $M_2$ is equal to 1. As an optional embodiment, the network device may transmit a metric information set to the terminal device, for example, a first metric information set corresponding to the first uplink transmitting beam, wherein the first metric information set may include identification information of each of the multiple uplink receiving beams and/or the metric value information of each of the multiple uplink beam pairs formed by the first uplink transmitting beam and the multiple uplink receiving beams. Optionally, the first metric information set further include the metric value information corresponding to the first uplink transmitting beam, which is not limited in this embodiment of the present disclosure.

As another optional embodiment, the network device may transmit multiple metric information sets corresponding to the multiple uplink transmitting beams to the terminal device, wherein the i-th metric information set corresponding to the uplink transmitting beam i may include one or more of: the identification information of the uplink transmitting beam i, the metric value information corresponding to the uplink transmitting beam i, the identification information of one or more uplink receiving beams, and the metric value information of one or more uplink beam pairs formed by the uplink transmitting beam i and the one or more uplink receiving beams, but the embodiment of the present disclosure is not limited thereto.

Optionally, the first metric information set may further include other information, and the embodiment of the present disclosure is not limited thereto.

In step S240, the network device transmits a downlink signal to the terminal device using each of the multiple downlink transmitting beams. Correspondingly, a downlink signal, transmitted by the network device using multiple downlink transmitting beams, is measured by the terminal device using each downlink receiving beam of the multiple downlink receiving beams, to obtain a downlink measured result.

Optionally, the multiple downlink transmitting beams may be part or all of the $D_2$ downlink transmitting beams of the network device, and the multiple downlink receiving beams may be part or all of the $D_1$ downlink receiving beams of the terminal device. And the embodiment of the present disclosure is not limited thereto.

Optionally, for the downlink signal transmitted by the network device using a downlink transmitting beam, and the measurement is performed by the terminal device using each of the multiple downlink receiving beams, to obtain the measured value of the downlink beam pair formed by the downlink receiving beam and the downlink transmitting beam. The signal, transmitted by each of the multiple downlink transmitting beams, may be measured by the terminal device to obtain a downlink measured result.

Optionally, the downlink measured result may include a measured value corresponding to each of the multiple downlink beam pairs formed by the multiple downlink receiving beams and the multiple downlink transmitting beams. Optionally, the metric value of each of the multiple downlink beams, according to the measured value corresponding to each of the multiple downlink beam pairs, may be further obtained by the terminal device. Optionally, the metric value of each downlink beam pair may be a function corresponding to the downlink beam pair, for example, the metric value of each downlink beam pair may be equal to the measured value corresponding to the downlink beam pair, but the embodiment of the present disclosure is not limited thereto. For specific implementations, reference may be made to the description of the uplink direction above, and no further details are provided herein for brevity.

Optionally, step S240 and steps S210-S230 may be executed in any order, which is not limited by the embodiment of the present disclosure.

In step S250, when the $M_1$ metric information sets transmitted by the network device are received by the terminal device, a correspondence result of the transmitting/receiving beam correspondence is determined according to the $M_1$ metric information sets and the downlink measured result obtained in step S240.

Optionally, the correspondence result of the transmitting/receiving beam correspondence may include whether the transmitting/receiving correspondence is established, or may further include the transmitting/receiving beam pair that satisfies the beam correspondence, which is not limited in this embodiment of the present disclosure.

Optionally, the correspondence result of the transmitting/receiving beam correspondence at the terminal device may be determined by the terminal device based on the $M_1$ metric information sets and the downlink measured result. For example, whether the transmitting/receiving beam correspondence is established at the terminal device may be determined by the terminal device based on the $M_1$ metric information sets and the downlink measured result. As an optional embodiment, a target downlink receiving beam from the multiple downlink receiving beams of the terminal device may be determine by the terminal device based on the downlink measured result, wherein optionally, the target downlink receiving beam may be a downlink receiving beam having the maximum metric value corresponding to the multiple downlink receiving beams of the terminal device, but the embodiment of the present disclosure is not limited thereto.

If the uplink transmitting beam to which the target downlink receive beam is mapped is referred to as a target uplink transmitting beam, the terminal device may determine whether the $M_1$ metric information set includes a metric information set corresponding to the target uplink transmitting beam. Optionally, if the metric information set corresponding to the target uplink transmitting beam is not included in the $M_1$ metric information set, the terminal device may determine that the transmitting/receiving beam correspondence is not established at the terminal device.

Optionally, if the $M_1$ metric information set includes a metric information set corresponding to the target uplink transmitting beam, optionally, the terminal device may directly determine that the transmitting/receiving beam correspondence is established at the terminal device; or the terminal device may further determine whether the metric information set corresponding to the target uplink transmitting beam satisfies the first preset condition. If the metric information set, corresponding to the target uplink transmitting beam, does not satisfy the first preset condition, the terminal device may determine that the transmitting/receiving beam correspondence is not established at the terminal device.

Optionally, if the metric information set corresponding to the target uplink transmitting beam satisfies the first preset condition, optionally, the terminal device may determine that the transmitting/receiving beam correspondence is established at the terminal device. Or the terminal device may further determine, based on other conditions, whether the transmitting/receiving beam correspondence is established at the terminal device.

Optionally, if the metric information set, corresponding to the target uplink transmitting beam, includes the metric value information corresponding to the target uplink transmitting beam, the first preset condition may include that a difference value between a metric value, corresponding to the target uplink transmitting beam, and the maximum metric values corresponding to the $M_1$ uplink transmitting beams is less than a third threshold.

Optionally, if the metric value set corresponding to the target uplink transmitting beam includes metric value information of each of the multiple uplink beam pairs formed by the target uplink transmitting beam, the first preset condition may include: if the downlink beam pair having the maximum metric value among the multiple downlink beam pairs formed by the downlink receiving beam, being referred to as a target downlink beam pair, and the uplink receiving beam, mapped by the downlink transmitting beam included in the target downlink beam pair, being referred to as a target uplink receiving beam, and a difference value between the metric value of the uplink beam pair, formed by the target uplink receiving beam and the target uplink transmitting beam, and the maximum metric value of the multiple uplink beam pairs, formed by the target uplink transmitting beam, being less than a fourth threshold. Optionally, the first preset condition may further include other specific conditions, and the embodiment of the present disclosure is not limited thereto.

In the embodiment of the present disclosure, considering the influence of factors such as measurement error and random interference during uplink signal transmission, even if the metric value corresponding to the target uplink transmitting beam is not the uplink transmitting beam having the maximum metric value among the $M_1$ uplink transmitting beams, the terminal device may still consider the target downlink receiving beam and the target uplink transmitting beam satisfy the transmitting/receiving beam correspondence, as long as the difference value between the metric value, corresponding to the uplink transmitting beam, and the maximum value of the metric values corresponding to the $M_1$ uplink transmitting beams is less than the third threshold.

Optionally, the third threshold value or the fourth threshold value may be defined by a protocol, or may be configured by a network device, or may be determined by the terminal device based on the transmission requirement, which is not limited by the embodiment of the present disclosure.

Optionally, the terminal device may further determine, based on the $M_1$ metric information sets and the downlink measured result, at least one transmitting/receiving beam pair, that satisfies beam correspondence, among the multiple uplink transmitting beams and the multiple downlink receiving beams of the terminal device, but the embodiment of the present disclosure is not limited thereto.

Optionally, the terminal device may also determine, based on the $M_1$ metric information sets and the downlink measured result, a correspondence result of the transmitting/receiving beam correspondence at the network device. For example, the terminal device may also determine, based on the $M_1$ metric information sets and the downlink measured result, whether the transmitting/receiving beam correspondence is established at the network device.

As an optional embodiment, the terminal device may determine the target downlink transmitting beam from multiple downlink transmitting beams of the network device based on the downlink measured result. Wherein, the target downlink transmitting beam may be a downlink transmitting beam having the maximum metric value corresponding to the multiple downlink transmitting beams. Or the terminal device may determine, based on the downlink measured result, at least one target downlink beam pair from the multiple downlink beam pairs formed by the multiple downlink receiving beams of the terminal device and the multiple downlink transmitting beams of the network device. Wherein the at least one target downlink beam pair may be the preceding one or more downlink beam pairs with the higher metric value among the multiple downlink beam pairs, but the embodiment of the present disclosure is not limited thereto.

Optionally, if the $M_1$ metric information sets include metric value information of an uplink beam pair formed by the uplink receiving beam to which the target downlink transmitting beam is mapped, and a difference value, between the metric value of the uplink beam pair and the maximum metric value in the $M_1$ metric information sets, is less than a fifth threshold, the terminal device may determine that the transmitting/receiving beam correspondence is established at the network device, but the embodiment of the present disclosure is not limited thereto.

Optionally, if the $M_1$ metric information set includes metric value information of one or more target downlink beam pairs in the at least one target downlink beam pair, and a difference value, between the metric value of the target downlink beam pair and the maximum metric value in the $M_1$ metric information set, is less than a sixth threshold, the terminal device may determine that the transmitting/receiving beam correspondence is established at the network device, but the embodiment of the present disclosure is not limited thereto.

The terminal device may further determine, based on the $M_1$ metric information sets and the downlink measured result, the multiple downlink transmitting beams of the network device and the transmitting/receiving beam pair that satisfies beam correspondence among the multiple uplink receiving beams.

Optionally, the method 200 may further include: transmitting, by the terminal device, correspondence indication information to the network device, wherein the correspondence indication information is used to indicate a correspondence result of the transmitting/receiving beam correspondence.

The correspondence indication information may only indicate whether the transmitting/receiving beam correspondence is established. Optionally, the correspondence indication information may be specifically used to indicate whether the transmitting/receiving beam correspondence is established at the terminal device and/or the network device, which is not limited by the embodiment of the present disclosure.

Optionally, the correspondence indication information may also be indicative of the transmitting/receiving beam pair of the terminal device that satisfies beam correspondence, and/or the transmitting/receiving beam pair of the network device that satisfies beam correspondence, but the embodiment of the present disclosure is not limited thereto.

Optionally, after the correspondence indication information, transmitted by the terminal device, is received, the network device may transmit an acknowledgement message to the terminal device, but the embodiment of the present disclosure is not limited thereto.

Optionally, the terminal device may further store the correspondence result of the transmitting/receiving beam correspondence determined in step S250, and may subsequently report the stored correspondence result of the transmitting/receiving beam correspondence to the network device, but the embodiment of the present disclosure is not limited thereto.

According to the wireless communication method provided by the embodiment of the present disclosure, the correspondence result of the transmitting/receiving beam correspondence is determined by the terminal device. Optionally, the terminal device may perform the foregoing process of determining the correspondence result of the transmitting/receiving beam correspondence periodically or in a triggering manner. As an optional embodiment, the terminal device may receive indication information of the network device for indicating the correspondence result of the transmitting/receiving beam correspondence of the terminal device. Correspondingly, the above-described process of determining the correspondence result of the transmitting/receiving beam correspondence is performed by the terminal device based on received indication information, but the embodiment of the present disclosure is not limited thereto.

As an optional embodiment, if the terminal device determines that the transmitting/receiving beam correspondence is established at the first instant, the transmitting/receiving beam correspondence may be deemed by the terminal device as being held within a preset time interval starting from the first instant. At the end of the preset time period, the terminal device may perform the above-described process of determining the correspondence result of the transmitting/receiving beam correspondence. For example, the terminal device may start a timer at the first instant, and perform the above-described process of determining the correspondence result of the transmitting/receiving beam correspondence when the timer expires. Wherein, optionally, the length of the preset time period may be defined in a protocol, or may be configured by a network device, which is not limited by the embodiment of the present disclosure.

As an optional embodiment, when it is determined by the terminal device that the transmission mode, used for data transmission with the network device, needs to be changed, or when it is determined that some of the transmission parameters in the current transmission mode need to be changed by the terminal device, the foregoing determining the correspondence result of the transmitting/receiving beam correspondence may be performed, but the embodiment of the disclosure is not limited thereto.

Thus, according to the wireless communication method provided by the embodiment of the present disclosure, the uplink signal, transmitted by the terminal device using multiple uplink transmitting beams, is measured by the network device, and $M_1$ metric information sets corresponding to $M_1$ uplink transmitting beams are transmitted to the terminal device, and the first metric information set of the $M_1$ metric information sets include at least one of the following: identification information of the first uplink transmitting beam of the $M_1$ uplink transmitting beams, metric value information corresponding to the first uplink transmitting beam, and identifier information of each of the $M_2$ uplink receiving beams of the network device, metric value information of each of the $M_2$ uplink beam pairs formed by the first uplink transmitting beam and the $M_2$ uplink receiving beams, the terminal device determines the correspondence result of the transmitting/receiving beam correspondence based on the $M_1$ metric information sets and the downlink measured results obtained by measuring the uplink signal transmitted by the network device using multiple downlink transmitting beams, which is beneficial to reduce signaling overhead and has better accuracy.

It should be understood that the magnitude of the sequence numbers of the above processes does not imply a sequence of executions, and the order of execution of the processes should be determined by its function and internal logic, and should not be construed as limiting the implementation process of the embodiments of the present disclosure.

The wireless communication method provided by the embodiment of the present disclosure will be described in detail below with reference to specific examples. In the following example, it is assumed that the terminal device has 4 beams, which may be used as both an uplink transmitting beam and a downlink receiving beam. The network device has 8 beams, which may be used as both an uplink receiving beam and a downlink transmitting beam.

Example 1

An uplink signal is transmitted by the terminal device using the 4 beams based on the configuration of the network device. For the uplink signal transmitted by the terminal device using an uplink transmitting beam i, receiving and measurement is performed by the network device using the 8 uplink receiving beams to obtain 8 measured values. The optimal measured value of the 8 measured values may be mapped into a metric value $V_i$ according to a certain rule. Wherein the optimal measured value may correspond to the optimal channel state, and the determination of the optimal measured value may be dependent on the measured quantity, which is not limited by the embodiment of the present disclosure.

i may sequentially take a value from 1 to 4, so that the network device may obtain 4 metric values $\{V_i, i=1, 2, 3, 4\}$ corresponding to the 4 uplink transmitting beams. The network device may select two metric values from $\{V_i\}$, such as two metric values with larger values, and the indication information is transmitted to the terminal device, wherein the indication information is indicative of two metric values selected by the network device.

It is assumed that the two metric values selected by the network device are $V_1$ and $V_4$, wherein $V_1 > V_4$, the indication information may optionally include the following information: {the number of uplink transmitting beam 1: UL_Tx_Beam_1, $V_1$} and {the number of uplink transmitting beam 4: UL_Tx_Beam_4, $V_4$}. Optionally, the indication information may include the following information: {UL_Tx_Beam 1, 0} and {UL_Tx_Beam 4, $\Delta_{14}$}, wherein $\Delta_{14}$ may represent the absolute value of the difference value or difference value between $V_4$ and $V_1$. Optionally, the indication information may also include the following information: {UL_Tx_Beam 1, UL_Tx_Beam 4, $\Delta_{14}$}, wherein the metric value corresponding to the uplink transmitting beam 1 is omitted, but the embodiment of the present disclosure is not limited thereto.

In addition, downlink signals are transmitted by the network device to the terminal device using 8 downlink transmitting beams. The terminal device may determine, by measuring the downlink signal transmitted by the network device, the optimal beam combination for downlink transmission as the downlink transmitting beam n (denoted as DL_Tx_Beam n) of the network device and the beam m of the terminal device (ie, DL_Rx_Beam m). The terminal device may determine whether the transmitting/receiving beam correspondence is established by determining whether the following two conditions are satisfied simultaneously.

Condition 1: whether the UL_Tx_Beam m mapped by the DL_Rx_Beam m is included in the indication information transmitted by the network device;

Condition 2: the difference value between the metric value corresponding to UL_Tx_Beam m and the maximum metric value indicated by the indication information is less than the third threshold.

Example 2

The uplink signal, transmitted by the terminal device using 4 uplink transmitting beams, is measured by the network device using 8 uplink receiving beams, to obtain an uplink measured result. Based on the uplink measured result, the 4 uplink beam pairs having the higher metric value may be selected by the network device from the 32 uplink beam pairs formed by the 8 uplink receiving beams and the 4 uplink transmitting beams, and the indication information is transmitted to the terminal device. The indication information may include information of each of the 4 uplink beam pairs.

For example, the four uplink beam pairs and their corresponding metric values may be described as follows.

[UL_Tx_Beam_1 UL_Rx_Beam_1 $V_1$];
[UL_Tx_Beam_1 UL_Rx_Beam_5 $V_2$];
[UL_Tx_Beam_4 UL_Rx_Beam_4 $V_3$];
[UL_Tx_Beam_4 UL_Rx_Beam_2 $V_4$];
Wherein, $V_1 \geq V_2 \geq V_3 \geq V_4$.

The downlink signal, transmitted by the network device using 8 downlink transmitting beams, is measured by the terminal device to obtain downlink measured result. The downlink beam pair composed of DL_Tx_Beam 4 and DL_Rx_Beam 4 is determined as a target downlink beam pair by the terminal device based on the downlink measured result. For example, the metric value of the downlink beam pair formed by DL_Tx_Beam 4 and DL_Rx_Beam 4 is the maximum, and the terminal device may determine whether UL_Tx_Beam_4 and DL_Rx_Beam_4 satisfy the beam correspondence by determining whether the following two conditions are satisfied simultaneously.

Condition 1: the indication information, transmitted by the network device to the terminal device, indicates the information of the [UL_Tx_Beam_4 UL_Rx_Beam_4] to which the [DL_Tx_Beam 4 DL_Rx_Beam 4] is mapped;

Condition 2: the difference value between the metric value of [UL_Tx_Beam_4 UL_Rx_Beam_4] and the maximum metric value indicated by the indication information is less than a certain threshold.

Example 3

The indication information, transmitted by the network device to the terminal device, may include information of each of the four uplink beam pairs. The four uplink beam pairs and their corresponding metric values may be described as follows.

[UL_Tx_Beam_1 UL_Rx_Beam_1 v_1];
[UL_Tx_Beam_2 UL_Rx_Beam_1 v_2];
[UL_Tx_Beam_3 UL_Rx_Beam_4 v_3];
[UL_Tx_Beam_4 UL_Rx_Beam_4 v_4];
Wherein, $V_1 \geq V_2 \geq V_3 \geq V_4$.

The downlink signals, transmitted by the network device using 8 downlink transmitting beams, may be measured by the terminal device to obtain downlink measured result. Optionally, if the difference value between the metric value of the [DL_Tx_Beam_1 DL_Rx_Beam_1], [DL_Tx_Beam_1 DL_Rx_Beam_2], [DL_Tx_Beam_4 DL_Rx_Beam_3], and [DL_Tx_Beam_4 DL_Rx_Beam_4] and the maximum metric value is less than a certain threshold, the terminal device may determine DL_Tx_Beam_1 and UL_Rx_Beam_1, and DL_Tx_Beam_4 and UL_Rx_Beam_4 corresponding to the network device satisfy the beam correspondence. Optionally, if the difference value between the metric value of the [DL_Tx_Beam_4 DL_Rx_Beam_3] and the [DL_Tx_Beam_4 DL_Rx_Beam_4] and the maximum metric value is greater than the threshold, it indicates that the channel quality corresponding to the two downlink beam pairs is poor, and the terminal device may determine that the DL_Tx_Beam_4 and UL_Rx_Beam_4 of the network device do not satisfy the beam correspondence.

It is to be understood that the above-described examples 1 to 3 are intended to assist those skilled in the art to better understand the embodiments of the present disclosure, and do not limit the scope of the embodiments of the present disclosure. A person skilled in the art will be able to make various modifications or changes in the form of the above-described examples, and such modifications or variations are also within the scope of the embodiments of the present disclosure.

The wireless communication method, according to an embodiment of the present disclosure, is described in detail above with reference to FIG. 1 and FIG. 2, and a wireless communication device, according to an embodiment of the present disclosure, will be described in detail below with reference to FIGS. 3-6.

Figure 3:
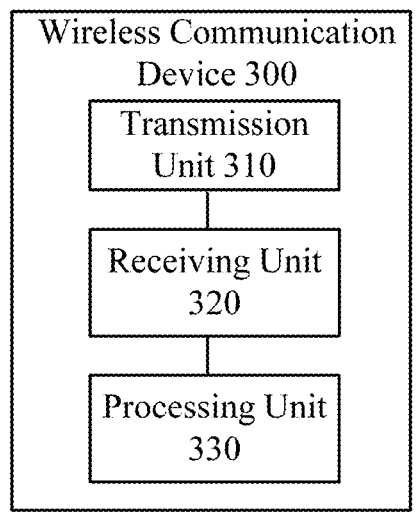
FIG. 3 is a schematic block diagram illustrating a wireless communication device according to an embodiment of the present disclosure.

FIG. 3 illustrates a wireless communication device 300 according to an embodiment of the present disclosure, including a transmission unit 310, a receiving unit 320 and a processing unit 330.

The transmission unit 310 is configured to transmit an uplink signal to a network device using each of multiple uplink transmitting beams The receiving unit 320 is configured to receive $M_1$ metric information sets corresponding to $M_1$ uplink transmitting beams transmitted by the network device, a first metric information set corresponding to a first uplink transmitting beam among the $M_1$ uplink transmitting beams include at least one of following information: metric value information corresponding to the first uplink transmitting beam, and metric value information of each of $M_2$ uplink beam pairs formed by the first uplink transmitting beam and $M_2$ uplink receiving beams of the network device, wherein the multiple uplink transmitting beams include the $M_1$ uplink transmitting beams, and a first uplink beam pair is formed by the first uplink transmitting beam and a first uplink receiving beam among the $M_2$ uplink receiving beams, and a metric value of the first uplink beam pair is obtained by the network device measuring, by means of the first uplink receiving beam, an uplink signal transmitted by the transmission unit 310 using the first uplink transmitting beam, $M_1$ and $M_2$ are integers greater than or equal to 1, and at most one of $M_1$ and $M_2$ is equal to 1.

The processing unit 330 is configured to measure, using each of multiple downlink receiving beams, a downlink signal transmitted by the network device using multiple downlink transmitting beams to obtain a downlink measured result, and determine a correspondence result of the transmitting/receiving beam correspondence according to the $M_1$ metric information sets received by the receiving unit 320 and the downlink measured result.

Optionally, the first metric information set further includes at least one of: identification information of the first uplink transmitting beam, and identification information of each of the $M_2$ uplink receiving beams.

Optionally, the metric value corresponding to the first uplink transmitting beam is specifically a metric value of an uplink beam pair corresponding to a maximum value in a first measured value set, the first measured value set is obtained by the network device measuring, by means of multiple uplink receiving beams, an uplink signal transmitted using the first uplink transmitting beam.

Optionally, the first measured value set includes at least one of: a signal strength, a SNR, a SINR and a rank value.

Optionally, the $M_2$ uplink beam pairs are preceding $M_2$ uplink beam pairs having higher metric value among multiple uplink beam pairs, wherein the multiple uplink beam pairs are formed by the first uplink transmitting beam and multiple uplink receiving beams of the network device.

Optionally, the first uplink beam pair is an uplink beam pair having a maximum metric value among multiple uplink beam pairs, wherein the multiple uplink beam pairs are formed by the first uplink transmitting beam and multiple uplink receiving beams of the network device. At this time, optionally, the $M_2$ uplink receiving beams further includes at least one second uplink receiving beam, at least a second uplink beam pair is formed by the at least one second uplink receiving beam and the first uplink transmitting beam, and a difference value between a metric value of each of the at least one second uplink beam pair and a metric value of the first uplink beam pair is less than a first threshold.

Optionally, the at least one second uplink beam pair includes preceding $M_2-1$ uplink beam pairs having higher metric value among the multiple uplink beam pairs other than the first uplink beam pair.

Optionally, a metric value information of a second uplink beam pair among the $M_2$ uplink beam pairs includes a difference value between a measured value corresponding to the second uplink beam pair and a measured value corresponding to an uplink beam pair prior to the second uplink beam pair.

Optionally, the metric value information of the second uplink beam pair among the $M_2$ uplink beam pairs includes a difference value between a measured value corresponding to the second uplink beam pair and a measured value corresponding to a first-ranked uplink beam pair in the multiple uplink beam pairs.

Optionally, the $M_1$ uplink transmitting beams are preceding $M_1$ uplink transmitting beams having higher metric value among the multiple uplink transmitting beams.

Optionally, the first uplink transmitting beam is an uplink transmitting beam having a maximum metric value among the multiple uplink transmitting beams. At this time, optionally, the $M_1$ uplink transmitting beams further includes at least one second uplink transmitting beam, a difference value between a metric value, corresponding to each of the at least one second uplink transmitting beam, and a metric value corresponding to the first uplink transmitting beam is less than a second threshold.

Optionally, the at least one second uplink transmitting beam includes preceding $M_1-1$ uplink transmitting beam having higher metric value among the multiple uplink transmitting beams other than the first uplink transmitting beam.

Optionally, the processing unit 330 is configured to:
determine the correspondence result of the transmitting/receiving beam correspondence at the terminal device according to the M1 metric information sets and the downlink measured result; and/or
determine the correspondence result of the transmitting/receiving beam correspondence at the network device according to the $M_1$ metric information sets and the downlink measured result.

Optionally, the transmission unit 310 is configured to transmit correspondence indication information to the network device, the correspondence indication information is indicative of the correspondence result of the transmitting/receiving beam correspondence determined by the processing unit 330.

Optionally, the correspondence indication information is specifically indicative of at least one of:
whether the transmitting/receiving beam correspondence is established at the terminal device;
whether the transmitting/receiving beam correspondence is established at the network device;
at least one transmitting/receiving beam pair satisfying beam correspondence included by the terminal device; and
at least one transmitting/receiving beam pair satisfying beam correspondence included by the network device.

Optionally, the processing unit 330 is configured to confirm, when a time interval between a current first time instant and a second time instant prior to the first time instant reaches a preset time interval, to perform the determining a correspondence result of transmitting/receiving beam correspondence, wherein the second time instant is a neighboring start time closest to when it is determined the transmitting/receiving beam correspondence is established.

Optionally, the processing unit 330 is configured to confirm, when the terminal device needs to change a transmission mode or a transmission parameter used for data transmission with the network device, to perform the determining a correspondence result of transmitting/receiving beam correspondence.

Optionally, the receiving unit 320 is configured to receive configuration indication information transmitted by the network device, wherein the configuration indication information is indicative of configuration to transmit the uplink signal Correspondingly, the transmission unit 310 is configured to transmit the uplink signal to the network device by using each of the multiple uplink transmitting beams based on the configuration indication information.

Optionally, the configuration indication information is indicative of at least one of following configuration parameters: a measurement order of the multiple uplink transmitting beams, a number of repeated measurements of the multiple uplink transmitting beams, a correspondence between the multiple uplink transmitting beams and at least one uplink signal, and a correspondence between the multiple uplink transmitting beams and transmission resource.

Optionally, the transmission unit 310 is configured to transmit the uplink signal to the network device by using each of the multiple uplink transmitting beams based on original configuration, the original configuration is used to transmit an uplink signal to the network device in previous process of the determining a correspondence result of transmitting/receiving beam correspondence.

Optionally, the uplink signal includes at least one of: a sounding reference signal SRS, a physical random access channel PRACH, a demodulation reference signal DMRS, and a dedicated uplink signal for beam measurement.

It should be understood that the device 300 herein is embodied in the form of a functional unit. In an optional example, those skilled in the art may understand that the device 300 may be specifically the terminal device in the foregoing embodiment, and the device 300 may be used to perform various processes and/or steps corresponding to the terminal device in the foregoing method embodiment. No further description is believed necessary to avoid repetition.

Figure 4:
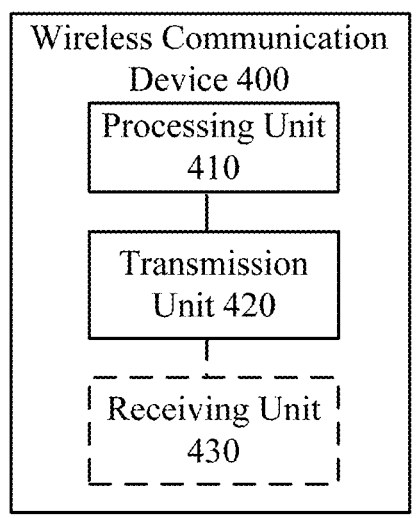
FIG. 4 is a schematic block diagram illustrating a wireless communication device according to another embodiment of the present disclosure.

FIG. 4 illustrates a wireless communication device 400 according to another embodiment of the present disclosure, including a processing unit 410 and a transmission unit 420.

The processing unit 410 is configured to measure, by using multiple uplink receiving beams, an uplink signal transmitted by each of multiple uplink transmitting beams to obtain an uplink measured result The transmission unit 420 is configured to transmit $M_1$ metric information sets corresponding to $M_1$ uplink transmitting beams to a terminal device based on the uplink measured result obtained by the processing unit 410, and a first metric information set corresponding to a first uplink transmitting beam among the $M_1$ uplink transmitting beams include at least one of the following: metric value information corresponding to the first uplink transmitting beam, and metric value information of each of $M_2$ uplink beam pairs formed by the first uplink transmitting beam and $M_2$ uplink receiving beams of the network device, wherein the multiple uplink transmitting beams include the $M_1$ uplink transmitting beams, the multiple uplink receiving beams include the $M_2$ uplink receiving beams, and a first uplink beam pair is formed by the first uplink transmitting beam and a first uplink receiving beam of the $M_2$ uplink receiving beams, a metric value of the first uplink beam pair is obtained by the network device measuring, by means of the first uplink receiving beam, an uplink signal transmitted by the terminal device by using the first uplink transmitting beam, $M_1$ and $M_2$ are integers greater than or equal to 1, and at most one of $M_1$ and $M_2$ is equal to 1.

Optionally, the first metric information set further includes at least one of the following: identification information of the first uplink transmitting beam, and identification information of each of the $M_2$ uplink receiving beams.

Optionally, the metric value corresponding to the first uplink transmitting beam is specifically a metric value of an uplink beam pair corresponding to a maximum value in a first measured value set, the first measured value set is obtained by the network device measuring, by means of multiple uplink receiving beams, an uplink signal transmitted by the terminal device using the first uplink transmitting beam.

Optionally, the first measured values set includes at least one of: a signal strength, a SNR, a SINR, and a rank value.

Optionally, the $M_2$ uplink beam pairs are preceding the first $M_2$ uplink beam pairs having higher metric value among the multiple uplink beam pairs, wherein the multiple uplink beam pairs are formed by the first uplink transmitting beam and multiple uplink receiving beams of the network device.

Optionally, the first uplink beam pair is an uplink beam pair having the maximum metric value among the multiple uplink beam pairs, wherein the multiple uplink beam pairs are formed by the first uplink transmitting beam and multiple uplink receiving beams of the network device. At this time, optionally, the $M_2$ uplink receiving beams further includes at least one second uplink receiving beam, at least a second uplink beam pair is formed by the at least one second uplink receiving beam and the first uplink transmitting beam, and a difference value between a metric value of each of the at least one second uplink beam pair and a metric value of the first uplink beam pair is less than a first threshold.

Optionally, the at least one second uplink beam pair includes preceding $M_2-1$ uplink beam pairs having higher metric value among the multiple uplink beam pairs other than the first uplink beam pair.

Optionally, a metric value information of a second uplink beam pair among the $M_2$ uplink beam pairs includes a difference value between a measured value corresponding to the second uplink beam pair and a measured value corresponding to an uplink beam pair prior to the second uplink beam pair.

Optionally, the metric value information of the second uplink beam pair among the $M_2$ uplink beam pairs includes a difference value between a measured value corresponding to the second uplink beam pair and a measured value corresponding to a first-ranked uplink beam pair in the multiple uplink beam pairs Optionally, the $M_1$ uplink transmitting beams are preceding $M_1$ uplink transmitting beams having higher metric value among the multiple uplink transmitting beams.

Optionally, the first uplink transmitting beam is an uplink transmitting beam having a maximum metric value among the multiple uplink transmitting beams. At this time, optionally, the $M_1$ uplink transmitting beams further includes at least one second uplink transmitting beam, a difference value between a metric value, corresponding to each of the at least one second uplink transmitting beam, and a metric value corresponding to the first uplink transmitting beam is less than a second threshold.

Optionally, the at least one second uplink transmitting beam includes preceding $M_1-1$ uplink transmitting beam having higher metric value among the multiple uplink transmitting beams other than the first uplink transmitting beam.

Optionally, the transmission unit 420 is further configured to transmit a downlink signal by using each of multiple downlink transmitting beams.

Optionally, referring to FIG. 4, the device 400 further includes a receiving unit 430, configured to receive a correspondence indication information transmitted by the terminal device, wherein the correspondence indication information is indicative of a correspondence result of the transmitting/receiving beam correspondence obtained by the terminal device according to the $M_1$ metric information sets transmitted by the transmission unit 420.

Optionally, the corresponding indication information is specifically indicative of at least one of:
whether the transmitting/receiving beam correspondence is established at the terminal device;
whether the transmitting/receiving beam correspondence is established at the network device;
at least one transmitting/receiving beam pair satisfying beam correspondence included at the terminal device; and
at least one transmitting/receiving beam pair satisfying beam correspondence included at the network device.

Optionally, the transmission unit 420 is further configured to: prior to the measuring, by the processing unit 410 using multiple uplink receiving beams, an uplink signal transmitted by each of multiple uplink transmitting beams, transmit configuration indication information to the terminal device, wherein the configuration indication information is indicative of configuration for the terminal device to transmit the uplink signal.

Optionally, the configuration indication information is indicative of at least one of the following configuration parameters: a measurement order of the multiple uplink transmitting beams, a number of repeated measurements of the multiple uplink transmitting beams, a correspondence between the multiple uplink transmitting beams and at least one uplink signal, and a correspondence between the multiple uplink transmitting beams and transmission resource.

Optionally, the uplink signal includes at least one of: a sounding reference signal SRS, a physical random access channel PRACH, a demodulation reference signal DMRS, and a dedicated uplink signal for beam measurement.

It should be understood that the device 400 herein is embodied in the form of a functional unit. In an optional example, those skilled in the art may understand that the device 400 may be specifically the network device in the foregoing embodiment, and the device 500 may be used to perform various processes and/or steps corresponding to the network device in the foregoing method embodiments. No further description is believed necessary to avoid repetition.

It should also be understood that in the embodiments of the present disclosure, the term "unit" may refer to an application specific integrated circuit (ASIC), an electronic circuit, a processor for executing one or more software or firmware programs (e.g., shared processors, proprietary processors or group processors, etc.) and memory, merge logic circuit, and/or other suitable components that support the described functionality.

Figure 5:
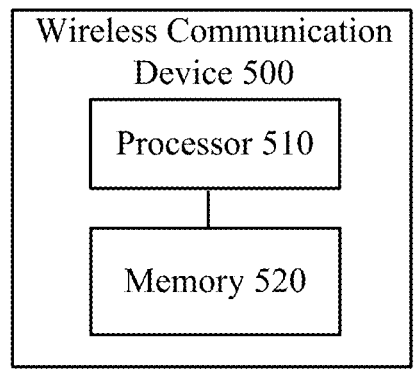
FIG. 5 is a schematic block diagram illustrating a wireless communication device according to yet another embodiment of the present disclosure.

FIG. 5 illustrates a wireless communication device 500 according to an embodiment of the present disclosure, including: a processor 510 and a memory 520, wherein the memory 520 is configured to store instructions, and the processor 510 is configured to execute the instructions stored in the memory 520, wherein execution of the instructions causes the processor 510 to perform the following operations.

An uplink signal is transmitted to a network device using each of multiple uplink transmitting beams.

$M_1$ metric information sets, corresponding to $M_1$ uplink transmitting beams and transmitted by the network device, are received by the terminal device, a first metric information set corresponding to a first uplink transmitting beam among the $M_1$ uplink transmitting beams include at least one of following information: metric value information corresponding to the first uplink transmitting beam, and metric value information of each of $M_2$ uplink beam pairs formed by the first uplink transmitting beam and $M_2$ uplink receiving beams of the network device, wherein the multiple uplink transmitting beams include the $M_1$ uplink transmitting beams, and a first uplink beam pair is formed by the first uplink transmitting beam and a first uplink receiving beam among the $M_2$ uplink receiving beams, and a metric value of the first uplink beam pair is obtained by the network device measuring, by means of the first uplink receiving beam, an uplink signal transmitted by the terminal device using the first uplink transmitting beam, $M_1$ and $M_2$ are integers greater than or equal to 1, and at most one of $M_1$ and $M_2$ is equal to 1.

A downlink signal, transmitted by the network device using multiple downlink transmitting beams, is measured using each of multiple downlink receiving beams, to obtain a downlink measured result.

A correspondence result of transmitting/receiving beam correspondence is determined according to the $M_1$ metric information sets and the downlink measured result.

In an optional example, those skilled in the art may understand that the device 500 may be specifically the terminal device in the foregoing embodiment, and the device 500 may be used to perform various processes and/or steps corresponding to the terminal device in the foregoing method embodiment. No further description is believed necessary to avoid repetition.

Figure 6:
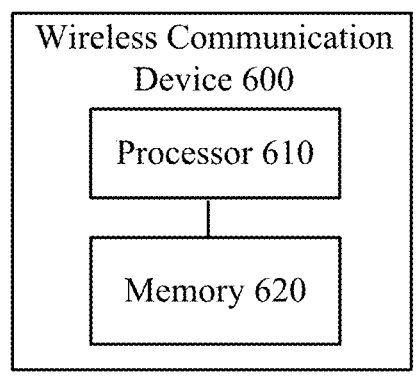
FIG. 6 is a schematic block diagram illustrating a wireless communication device according to still another embodiment of the present disclosure.

FIG. 6 illustrates a wireless communication device 600 according to an embodiment of the present disclosure, including: a processor 610 and a memory 620, wherein the memory 620 is configured to store instructions, and the processor 610 is configured to execute the instructions stored in the memory 620, wherein execution of the instruction causes the processor 610 to perform the following operations.

An uplink signal, transmitted by a terminal device using multiple uplink transmitting beams, is measured using multiple uplink receiving beams, to obtain an uplink measured result.

$M_1$ metric information sets corresponding to $M_1$ uplink transmitting beams are transmitted to a terminal device based on the uplink measured result, and a first metric information set corresponding to a first uplink transmitting beam among the $M_1$ uplink transmitting beams include at least one of the following: metric value information corresponding to the first uplink transmitting beam, and metric value information of each of $M_2$ uplink beam pairs formed by the first uplink transmitting beam and $M_2$ uplink receiving beams of the network device, wherein the multiple uplink transmitting beams include the $M_1$ uplink transmitting beams, the multiple uplink receiving beams include the $M_2$ uplink receiving beams, and a first uplink beam pair is formed by the first uplink transmitting beam and a first uplink receiving beam of the $M_2$ uplink receiving beams, a metric value of the first uplink beam pair is obtained by the network device measuring, by means of the first uplink receiving beam, an uplink signal transmitted by the terminal device using the first uplink transmitting beam, $M_1$ and $M_2$ are integers greater than or equal to 1, and at most one of $M_1$ and $M_2$ is equal to 1.

In an optional example, those skilled in the art may understand that the device 600 may be specifically the network device in the foregoing embodiment, and the device 600 may be used to perform various processes and/or steps corresponding to the network device in the foregoing method embodiment. No further description is believed necessary to avoid repetition.

It should be understood that, in the embodiment of the present disclosure, the processor may be a central processing unit (CPU), and the processor may also be other general-purpose processors, digital uplink signal processors (DSPs), and application specific integrated circuits (ASIC), field programmable gate array (FPGA) or other programmable logic devices, discrete gate or transistor logic devices, discrete hardware components, and more. The general-purpose processor may be a microprocessor or the processor or any conventional processor or the like.

The memory may include read-only memory and random access memory and provides instructions and data to the processor. A portion of the memory may also include a non-volatile random access memory. For example, the memory may also store type information of the device. The processor may be used to execute instructions stored in the memory, and when the processor executes the instructions, the processor may perform the steps corresponding to the terminal device in the above method embodiments.

In the implementation process, each step of the above method may be completed by an integrated logic circuit of hardware in a processor or an instruction in a form of software. The steps of the method disclosed in the embodiments of the present disclosure may be directly implemented as a hardware processor, or may be performed by a combination of hardware and software modules in the processor. The software module may be located in a conventional storage medium in the field such as random access memory, flash memory, read-only memory, programmable read-only memory or electrically erasable programmable memory, registers, and the like. The storage medium is located in a memory, and the processor executes instructions in the memory, in combination with hardware to perform the steps of the above method. No further description is believed necessary to avoid repetition.

It should be understood that the above description of the embodiments of the present disclosure emphasizes the differences between the various embodiments, and the same or similar points that are not mentioned may be referred to each other, and are not described herein again for brevity.

Moreover, the terms "system" and "network" are used interchangeably herein. The term "and/or" in this context is merely an association describing the associated object, indicating that there may be three relationships, for example, A and/or B may indicate these three situations. A exists separately, and both A and B exist, B exists separately. In addition, the character "/" in this context generally indicates that the contextual object is an "or" relationship.

Those skilled in the art will appreciate that the various method steps and elements described in connection with the embodiments disclosed herein may be implemented in electronic hardware, computer software, or a combination of both, in order to clearly illustrate interchangeability of hardware and software, the steps and components of the various embodiments have been generally described in terms of function in the foregoing description. Whether these functions are performed in hardware or software depends on the specific application and design constraints of the technical scheme. One of ordinary skill in the art may use different methods to implement the described functionality for each particular application, but such implementation should not be considered to be beyond the scope of the present disclosure.

A person skilled in the art may clearly understand that, for the convenience and brevity of the description, the specific working process of the system, the device and the unit described above may refer to the corresponding process in the foregoing method embodiment, and details are not described herein again.

In the several embodiments provided by the present disclosure, it should be understood that the disclosed systems, devices, and methods may be implemented in other manners. For example, the device embodiments described above are merely illustrative. For example, the division of the unit is only a logical function division. In actual implementation, there may be other division manners, for example, multiple units or components may be combined or may be integrated into another system, or some features may be ignored or not executed. In addition, the mutual coupling, direct coupling or communication connection shown or discussed may be an indirect coupling or communication connection through some interface, device or unit, or an electrical, mechanical or other form of connection.

The units described as separate components may or may not be physically separated, and the components as the display units may or may not be physical units, that is, may be located in one place, or may be distributed to multiple network units. Some or all of the units may be selected, based on actual needs, to achieve the objectives of the embodiments of the present disclosure.

In addition, each functional unit in various embodiment of the present disclosure may be integrated into one processing unit, or each unit may exist physically separately, or two or more units may be integrated into one unit. The above integrated unit may be implemented in the form of hardware or in the form of a software functional unit.

The integrated unit, if implemented in form of a software functional unit and sold or used as a standalone product, may be stored in a computer readable storage medium. Based on such understanding, the technical solution of the present disclosure, or the portion of the disclosure that makes contribution to the prior art, may be embodied in the form of a computer software product that is stored in a storage medium, including instructions for causing a computer device (which may be a personal computer, a server or a network device, etc.) to perform all or part of the steps of the method of the various embodiments of the disclosure. The foregoing storage medium includes: a U disk, a mobile hard disk, a read-only memory (ROM), a random access memory (RAM), a magnetic disk, or an optical disk, and the like, which may store program codes.

The above is only the specific embodiment of the present disclosure, but the scope of the present disclosure is not limited thereto, and any equivalent modification or replacement may be easily conceived by anyone skilled in the art within the technical scope of the present disclosure. These modifications or replacements are intended to be included within the scope of the disclosure. Therefore, the scope of protection of the present disclosure should be determined by the scope of the claims.

What is claimed is:

1. A wireless communication method, comprising:
   transmitting, by a terminal device, an uplink signal to a network device using each of multiple uplink transmitting beams;
   receiving, by the terminal device, $M_1$ metric information sets corresponding to $M_1$ uplink transmitting beams transmitted by the network device, a first metric information set corresponding to a first uplink transmitting beam among the $M_1$ uplink transmitting beams comprising at least one of: metric value information corresponding to the first uplink transmitting beam, and metric value information of each of $M_2$ uplink beam pairs formed by the first uplink transmitting beam and $M_2$ uplink receiving beams of the network device, wherein the multiple uplink transmitting beams comprise the $M_1$ uplink transmitting beams, and a first uplink beam pair is formed by the first uplink transmitting beam and a first uplink receiving beam among the $M_2$ uplink receiving beams, and a metric value of the first uplink beam pair is obtained by the network device measuring, by means of the first uplink receiving beam, an uplink signal transmitted by the terminal device using the first uplink transmitting beam, $M_1$ and $M_2$ being integers greater than or equal to 1, and at most one of $M_1$ and $M_2$ being equal to 1;
   measuring, by the terminal device using each of multiple downlink receiving beams, a downlink signal transmitted by the network device using multiple downlink transmitting beams to obtain a downlink measured result; and
   determining, by the terminal device, a correspondence result of transmitting/receiving beam correspondence according to the $M_1$ metric information sets and the downlink measured result.

2. The method according to claim 1, wherein the first metric information set further comprises at least one of: identification information of the first uplink transmitting beam, and identification information of each of the $M_2$ uplink receiving beams.

3. The method according to claim 1, wherein the metric value corresponding to the first uplink transmitting beam is a metric value of an uplink beam pair corresponding to a maximum value in a first measured value set, the first measured value set being obtained by the network device measuring, by means of multiple uplink receiving beams, an uplink signal transmitted by the terminal device using the first uplink transmitting beam.

4. The method according to claim 1, wherein the M2 uplink beam pairs are preceding M2 uplink beam pairs having higher metric value among multiple uplink beam pairs, wherein the multiple uplink beam pairs are formed by the first uplink transmitting beam and multiple uplink receiving beams of the network device.

5. The method according to claim 1, wherein the first uplink beam pair is an uplink beam pair having a maximum metric value among multiple uplink beam pairs, wherein the multiple uplink beam pairs are formed by the first uplink transmitting beam and multiple uplink receiving beams of the network device; wherein the M2 uplink receiving beams further comprises at least one second uplink receiving beam, at least a second uplink beam pair is formed by the at least one second uplink receiving beam and the first uplink transmitting beam, and a difference value between a metric value of each of the at least one second uplink beam pair and a metric value of the first uplink beam pair is less than a first threshold.

6. The method according to claim 5, wherein the at least one second uplink beam pair comprises preceding $M_2-1$ uplink beam pairs having higher metric value among the multiple uplink beam pairs other than the first uplink beam pair.

7. The method according to claim 1, wherein, a metric value information of a second uplink beam pair among the $M_2$ uplink beam pairs comprises one of the following:
   a difference value between a measured value corresponding to the second uplink beam pair and a measured value corresponding to an uplink beam pair prior to the second uplink beam pair;
   a difference value between a measured value corresponding to the second uplink beam pair and a measured value corresponding to a first-ranked uplink beam pair in the multiple uplink beam pairs.

8. The method according to claim 1, wherein the $M_1$ uplink transmitting beams are preceding $M_1$ uplink transmitting beams having higher metric value among the multiple uplink transmitting beams.

9. The method according to claim 1, wherein the first uplink transmitting beam is an uplink transmitting beam having a maximum metric value among the multiple uplink transmitting beams; and
wherein the $M_1$ uplink transmitting beams further comprise at least one second uplink transmitting beam, a difference value between a metric value, corresponding to each of the at least one second uplink transmitting beam, and a metric value corresponding to the first uplink transmitting beam is less than a second threshold.

10. The method according to claim 9, wherein the at least one second uplink transmitting beam comprises preceding $M_1-1$ uplink transmitting beam having higher metric value among the multiple uplink transmitting beams other than the first uplink transmitting beam.

11. The method according to claim 1, wherein the determining, by the terminal device, a correspondence result of transmitting/receiving beam correspondence according to the $M_1$ metric information sets and the downlink measured result, comprises at least one step of:
determining, by the terminal device, the correspondence result of transmitting/receiving beam correspondence at the terminal device according to the $M_1$ metric information sets and the downlink measured result; and
determining, by the terminal device, the correspondence result of transmitting/receiving beam correspondence at the network device according to the $M_1$ metric information sets and the downlink measured result.

12. The method according to claim 1, wherein the method further comprises:
transmitting, by the terminal device, correspondence indication information to the network device, the correspondence indication information being indicative of the correspondence result of transmitting/receiving beam correspondence.

13. The method according to claim 12, wherein the correspondence indication information is indicative of at least one of:
whether the transmitting/receiving beam correspondence is established at the terminal device;
whether the transmitting/receiving beam correspondence is established at the network device;
at least one transmitting/receiving beam pair satisfying beam correspondence comprised by the terminal device; and
at least one transmitting/receiving beam pair satisfying beam correspondence comprised by the network device.

14. The method according to claim 1, wherein, prior to the transmitting, by the terminal device, the uplink signal to the network device by using each of multiple uplink transmitting beams, the method further comprises:
confirming by the terminal device, when a time interval between a current first time instant and a second time instant prior to the first time instant reaches a preset time interval, to perform the determining a correspondence result of transmitting/receiving beam correspondence, wherein the second time instant is a neighboring start time closest to when it is determined the transmitting/receiving beam correspondence is established.

15. The method according to claim 1, wherein, prior to the transmitting, by the terminal device, the uplink signal to the network device by using each of multiple uplink transmitting beams, the method further comprises:
confirming by the terminal device, when the terminal device needs to change a transmission mode or a transmission parameter used for data transmission with the network device, to perform the determining a correspondence result of transmitting/receiving beam correspondence.

16. The method according to claim 1, wherein, prior to the transmitting, by the terminal device, the uplink signal to the network device by using each of multiple uplink transmitting beams, the method further comprises:
receiving, by the terminal device, configuration indication information transmitted by the network device, wherein the configuration indication information is indicative of configuration for the terminal device to transmit the uplink signal;
the transmitting, by the terminal device, the uplink signal to the network device by using each of multiple uplink transmitting beams comprises:
transmitting, by the terminal device, the uplink signal to the network device by using each of the multiple uplink transmitting beams based on the configuration indication information.

17. The method according to claim 16, wherein the configuration indication information is indicative of at least one of following configuration parameters: a measurement order of the multiple uplink transmitting beams, a number of repeated measurements of the multiple uplink transmitting beams, a correspondence between the multiple uplink transmitting beams and at least one uplink signal, and a correspondence between the multiple uplink transmitting beams and transmission resource.

18. The method according to claim 1, wherein the transmitting, by the terminal device, the uplink signal to the network device by using each of multiple uplink transmitting beams comprises:
transmitting, by the terminal device, the uplink signal to the network device by using each of the multiple uplink transmitting beams based on original configuration, the original configuration being used by the terminal device to transmit an uplink signal to the network device in a previous process of the determining the correspondence result of transmitting/receiving beam correspondence.

19. A wireless communication method, comprising:
measuring, by a network device using multiple uplink receiving beams, an uplink signal transmitted by a terminal device using each of multiple uplink transmitting beams to obtain an uplink measured result;
transmitting, by the network device, $M_1$ metric information sets corresponding to $M_1$ uplink transmitting beams to the terminal device based on the uplink measured result, a first metric information set corresponding to a first uplink transmitting beam among the $M_1$ uplink transmitting beams comprising at least one of: metric value information corresponding to the first uplink transmitting beam, and metric value information of each of $M_2$ uplink beam pairs formed by the first uplink transmitting beam and $M_2$ uplink receiving beams of the network device, wherein the multiple uplink transmitting beams comprise the $M_1$ uplink transmitting beams, the multiple uplink receiving beams comprise the $M_2$ uplink receiving beams, and a first uplink beam pair is formed by the first uplink transmitting beam and a first uplink receiving beam of the $M_2$ uplink receiving beams, a metric value of the first uplink beam pair is obtained by the network device measuring, by means of the first uplink receiving beam, an uplink signal transmitted by the terminal device using the first uplink transmitting beam, $M_1$ and $M_2$ being integers greater than or equal to 1, and at most one of $M_1$ and $M_2$ being equal to 1.

20. A terminal device, comprising a memory and a processor, wherein the memory stores instructions, the processor is configured to execute instructions stored in the memory, and the instructions, when being executed by the processor, causes the processor to perform:

transmitting an uplink signal to a network device using each of multiple uplink transmitting beams;

receiving $M_1$ metric information sets corresponding to $M_1$ uplink transmitting beams transmitted by the network device, a first metric information set corresponding to a first uplink transmitting beam among the $M_1$ uplink transmitting beams comprising at least one of: metric value information corresponding to the first uplink transmitting beam, and metric value information of each of $M_2$ uplink beam pairs formed by the first uplink transmitting beam and $M_2$ uplink receiving beams of the network device, wherein the multiple uplink transmitting beams comprise the $M_1$ uplink transmitting beams, and a first uplink beam pair is formed by the first uplink transmitting beam and a first uplink receiving beam among the $M_2$ uplink receiving beams, and a metric value of the first uplink beam pair is obtained by the network device measuring, by means of the first uplink receiving beam, an uplink signal transmitted by a terminal device using the first uplink transmitting beam, $M_1$ and $M_2$ being integers greater than or equal to 1, and at most one of $M_1$ and $M_2$ being equal to 1;

measuring, by using each of multiple downlink receiving beams, a downlink signal transmitted by the network device using multiple downlink transmitting beams to obtain a downlink measured result; and determining a correspondence result of transmitting/receiving beam correspondence according to the $M_1$ metric information sets and the downlink measured result.

* * * * *